(12) United States Patent
Lubman et al.

(10) Patent No.: US 8,132,514 B2
(45) Date of Patent: Mar. 13, 2012

(54) LAP BAR ASSEMBLY WITH LOCKING MECHANISM WITH LOCKING IN LAP BAR AND GRAB BAR POSITIONS

(75) Inventors: Phillip J. Lubman, Anaheim, CA (US); Sean A. Ramirez, Anaheim, CA (US)

(73) Assignee: Disney Enterprises, Inc., Burbank, CA (US)

( * ) Notice: Subject to any disclaimer, the term of this patent is extended or adjusted under 35 U.S.C. 154(b) by 257 days.

(21) Appl. No.: 12/567,501

(22) Filed: Sep. 25, 2009

(65) Prior Publication Data

US 2010/0307288 A1    Dec. 9, 2010

Related U.S. Application Data

(60) Provisional application No. 61/217,920, filed on Jun. 5, 2009.

(51) Int. Cl.
*A62B 35/00* (2006.01)

(52) U.S. Cl. .................................................. 104/241

(58) Field of Classification Search .............. 104/53–57, 104/63, 64, 69, 74–76, 241; 297/487, 488; 280/748, 753
See application file for complete search history.

(56) References Cited

U.S. PATENT DOCUMENTS

| | | | |
|---|---|---|---|
| 1,597,491 A * | 8/1926 | Traver | 104/241 |
| 1,659,108 A * | 2/1928 | Illions | 104/241 |
| 3,934,898 A | 1/1976 | Long | |
| 5,453,053 A * | 9/1995 | Danta et al. | 472/29 |
| 5,529,382 A | 6/1996 | Burkat | |
| 5,697,628 A | 12/1997 | Spear | |
| 6,299,207 B1 | 10/2001 | Bares | |
| 6,390,562 B1 | 5/2002 | Takamizu et al. | |
| 6,971,316 B2 | 12/2005 | Hansen et al. | |
| 7,204,559 B2 | 4/2007 | Berra | |
| 7,640,862 B2 * | 1/2010 | Zamperla | 104/53 |
| 2007/0228712 A1 * | 10/2007 | Hansen et al. | 280/748 |
| 2008/0150345 A1 | 6/2008 | Blum et al. | |

FOREIGN PATENT DOCUMENTS

EP    1036717 A2    9/2000

* cited by examiner

*Primary Examiner* — S. Joseph Morano
*Assistant Examiner* — R. J. McCarry, Jr.
(74) *Attorney, Agent, or Firm* — March Fischmann & Breyfogle LLP; Kent A. Lembke

(57) ABSTRACT

A lap bar assembly with dual lap bar and grab bar functions. The assembly includes a locking mechanism and a lap bar pivotally mounted to the locking mechanism via a support shaft. The locking mechanism includes a ratchet wheel affixed to the support shaft. A pawl is pivotally supported within the locking mechanism on a pawl support axle parallel to and spaced apart from the lap bar support shaft. The locking mechanism includes a trip cam pivotally attached to the lap bar support shaft. The locking mechanism includes a cam follower that selectively engages the pawl. The locking mechanism is configured to automatically first lock in a first position (or ride position) with the pawl engaging teeth of the ratchet wheel and then second lock in a second position (or released position) with the pawl engaging the ratchet wheel on an uplock surface spaced apart the ratchet teeth.

34 Claims, 13 Drawing Sheets

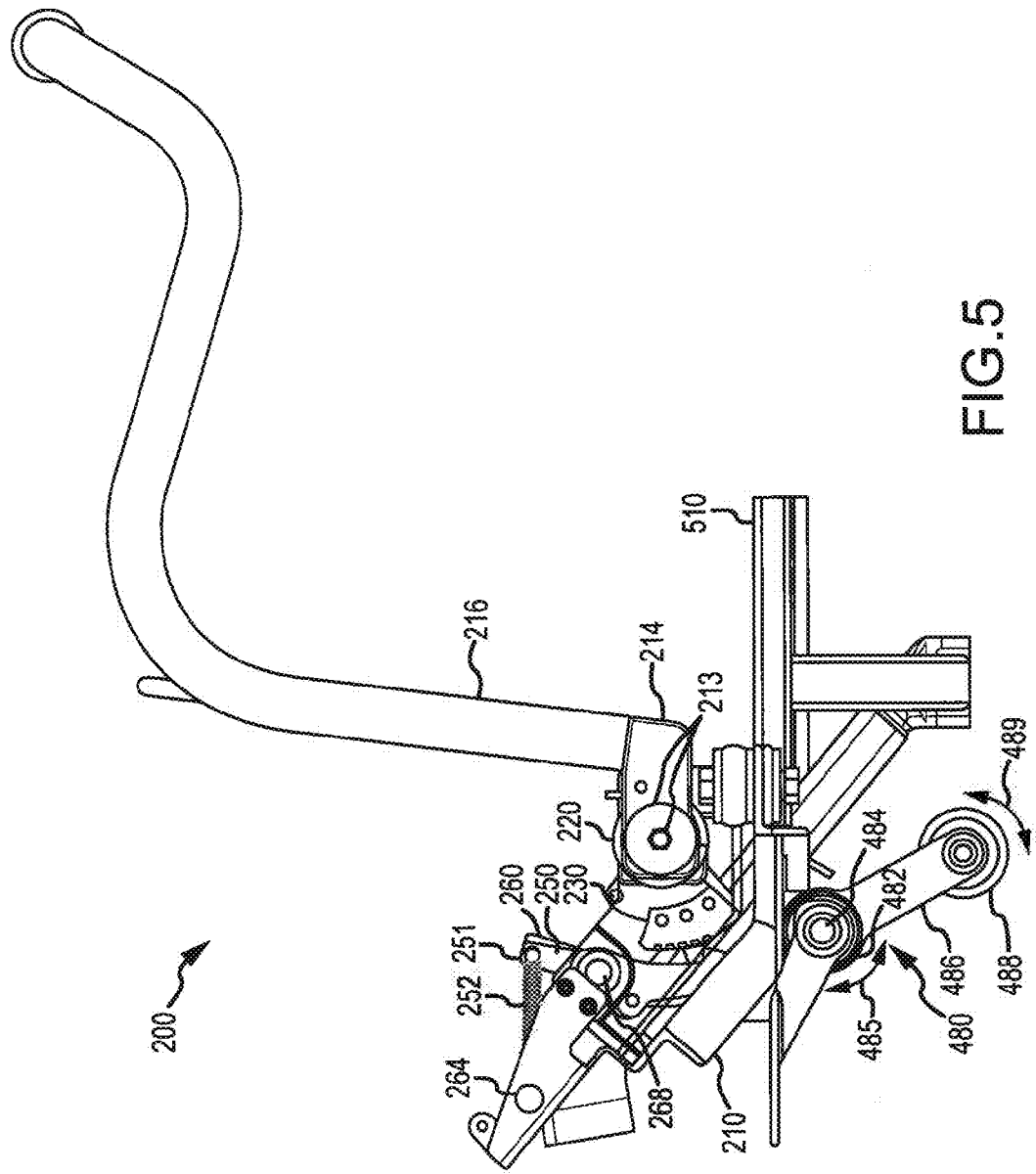

LAP BAR ASSEMBLY WITH LOCKING MECHANISM WITH LOCKING IN LAP BAR AND GRAB BAR POSITIONS

CROSS-REFERENCE TO RELATED APPLICATIONS

This application claims the benefit of U.S. Provisional Application No. 61/217,920 filed Jun. 5, 2009, which is incorporated herein by reference in its entirety.

BACKGROUND OF THE INVENTION

1. Field of the Invention

The present invention relates, in general, to amusement park rides and passenger restraints in such rides and other implementations, and, more particularly, to a lap bar assembly for an amusement park ride providing locking in both a ride or down position and in a released or up position to provide lap bar and grab bar functionality in an automated manner.

2. Relevant Background

Passenger restraints such as lap bars are used throughout the amusement park industry to safely and securely restrain passengers within a seat of a vehicle. For example, many amusement park rides provide themed rides in which vehicles ride along on one or more tracks, and the passengers are restrained from standing up or leaving the vehicle by a lap bar that is positioned across their laps or provided over their shoulders as an overhead or similar restraint. During loading, the lap bar is typically positioned against the passenger by a ride operator that is pressing a foot lever to allow adjustment of the position of the lap bar relative to the passengers. Once in position, the operator releases the foot lever or pedal to lock the lap bar in this ride or down position. When the ride is over, the vehicle may pass over a portion of the track with a release mechanism causing the lap bar to become unlocked from the ride position. The lap bar then may spring to an open or up position.

There are a number of concerns with these conventional lap bar assemblies including the fact that these assemblies only lock in the ride or down position and not in the up position. In other words, existing lap bar assemblies are not useful as supports or grab bars during loading and unloading and will typically freely move when grabbed by a passenger for support, which can cause the passenger to lose balance or the bar to move quickly downward toward other passengers. Additionally, conventional lap bars typically only provide one locking position that is set manually by the ride operator, and this one-size-fits-all approach may make it difficult for one lap bar to be used for multiple passengers of differing size as the bar may only be positioned against or near the largest passenger.

Guest positioning and restraint systems have utilized a variety of modes of locking the lap bar such as providing a friction lock device. Friction locks create a large amount of wear on the locking rod as they are actuated, and this wear can require ongoing or frequent adjustment to ensure the mechanism is still locking per the design intent. Some existing friction lock designs require multiple linkages with complex parts and complexity. Another disadvantage of some friction lock designs is that the lap bar can be forced open. The lap bar can be pushed with enough force such that the frictional force is overcome, which opens the lap bar. Grease, dirt, and/or lubricants on the locking rod can decrease the force required to open the lap bar or even disable the lock entirely. If multiple patrons are restrained under a single lap bar, the load per patron to overcome the frictional lock and release the lap bar decreases, e.g., if the force were 200 pounds, two passengers would have to apply 100 pounds each to release the lap bar. Further, friction locks begin working as soon as the lap bar is lowered. This may be an undesirable effect if the operator wants to ensure the lap bar is locked at a certain distance or space relative to the passengers.

Some passenger restraint systems using ratchet systems have been developed, but these have not been widely adopted for a number of reasons. For example, ratchet-based restraint systems are generally not automated but instead require a passenger sitting in a vehicle seat to manually pull and hold a lever out such that the pawls are backed off the ratchet wheel. Only in response to such passenger/operator manual positioning can the lap bar be released. However, due to the environmental conditions found in a theme or amusement park and their rides, it is typically preferred that the passengers sitting in the vehicle seat cannot manually or otherwise unlock the restraint device, e.g., cannot raise the lap bar during the ride or too early at the station. It is also advantageous in some cases that the unlocking of the restraint, releasing of the lap bar, and locking in an uplock or raised position are provided automatically (or without operator or passenger intervention), and ratchet-based passenger restraints have not provided such functionality.

SUMMARY OF THE INVENTION

The present invention addresses the above and other problems by providing a locking mechanism for use in a lap bar or other passenger restraint assembly in an amusement park ride vehicle. The locking mechanism is connected to a lap bar and operates such that the lap bar may act as a normal restraint during ride operation, meaning it locks in a lowered or first lock position to prevent passengers from lifting the lap bar and exiting the vehicle. The locking mechanism also is operable such that the lap bar also functions as a grab bar or support rail in a fully raised or second lock position during vehicle loading and unloading, meaning that the locking mechanism locks in the released/raised position preventing the passenger from moving the lap bar while they use it to steady themselves or for support.

Briefly, the locking mechanism may be adapted to stop an attached lap bar from rotating in two different directions at different times of the operation of the locking mechanism. The locking mechanism may use a ratchet wheel with multiple ratchets (or two side-by-side ratchet wheels) and at least two pawls along with a trip cam and a cam follower. During ride operation with the locking mechanism in a first locked or down position, the pawls are engaged with the ratchet teeth of the ratchet wheel thus preventing the lap bar from rotating in the release or up direction. When the vehicle carrying the locking mechanism enters a load/unload station or portion of a ride, the cam follower rolls over a station or platform cam causing it to rotate and contact/release the pawls from the ratchet teeth. This movement of the pawls allows a trip cam, which had been held in place by a pawl roller/pin on one of the pawls, to rotate or spring upward to engage the pawl (such as with its tip abutting the pawl roller).

The trip cam acts to hold the pawls away or spaced apart from the ratchet teeth, which allows the lap bar to rise or rotate via a restoring/positioning force applied by a lap bar return spring to an up or released position away from the passenger's laps. The motion and timing of the moving/releasing lap bar acts to disengage the trip cam when it reached a fully released or an uplock position, and the spring-loaded pawls drop onto a top ledge or surface of the ratchet wheel above the teeth portion. Once in this second locked position, the pawls act to prevent the rotation of the lap bar in the lowering direction. After one set of passengers leaves the vehicle and another set enters the vehicle, a ride operator may press a foot pedal of a lap bar release mechanism that is interconnected with the cam follower to force the pawls off of the ratchet wheel uplock surface (but not to allow the trip cam to re-engage) so as to re-engage with the teeth of the ratchet wheel. The passengers can then ratchet or adjust the lap bar with further downward rotation (or toward the seat and their laps) to provide secure/snug positioning based on their particular size or girth.

More particularly, a lap bar assembly for use in ride vehicles is provided with a locking mechanism and a lap bar pivotally mounted to the locking mechanism via a support shaft or axle (e.g., a position-control shaft). The locking mechanism may include a ratchet wheel affixed to the lap bar support axle. A pawl may be provided in the locking mechanism, and it may be pivotally supported within the locking mechanism but on a separate pawl support axle or shaft that is parallel and spaced apart from the lap bar support axle. The locking mechanism may also include a trip cam that is pivotally attached to the lap bar support axle (such as with a spring or similar member applying a tensile force on one end causing an opposite end or arm to rotate upward and contact a roller pin on the side of the pawl).

The locking mechanism may also include a cam follower assembly that selectively engages the pawl. In some embodiments, the locking mechanism components are configured to automatically first lock in a first position (or ride/down position) with the pawl engaging teeth of the ratchet wheel and then second lock in a second position (or released/fully up position) with the pawl now engaging the ratchet wheel in an uplock surface that is spaced apart (but typically adjacent) the teeth of the ratchet wheel. Between the first and second locked position, the locking mechanism may be placed in a travel or first unlocked position when the cam follower contacts a station cam over which the vehicle travels as it enters a load/unload portion of the ride. The cam follower may contact the pawl causing it to disengage from the teeth (or disengage from the first locked position) and move apart from the ratchet wheel a distance or space large enough to free the trip cam, which then rotates due to a spring force to have a tip of its arms (or otherwise) engage a pawl roller on the pawl. This spaced apart position between the pawl and the ratchet wheel allows a lap bar return spring provided on the lap bar support axle to apply a release force on the lap bar and the locking mechanism to rotate the lap bar up to the released or uplock/fully up position. At this point, the ratchet wheel (or a striker/pin on such wheel) contacts the trip cam knocking it down off the pawl roller and causing the pawl to move into the second locked position.

BRIEF DESCRIPTION OF THE DRAWINGS

FIG. 5 illustrates a left hand or outside a vehicle side view of the restrain locking mechanism of FIGS. 2-4 with a full lap bar.

DETAILED DESCRIPTION OF THE PREFERRED EMBODIMENTS

Due to the geometry of vehicles in amusement park rides and the slight vehicle motion during guest loading and unloading, the present description provides a lap bar assembly with a locking mechanism/assembly that locks in both the ride/lowered and the released/raised positions. The lap bar assembly functions as a normal restraint during ride operation. More specifically, the locking mechanism of the lap bar assembly is configured to lock a lap bar in a lowered position to prevent guests or riders from lifting the lap bar and exiting the vehicle. The locking mechanism of the lap bar assembly also functions as a grab bar or rail in the fully raised or released position during vehicle loading and unloading. Specifically, the locking mechanism is configured to lock the lap bar in the released position such that a guest or rider cannot move the lap bar and can use the lap bar to steady or support themselves as they enter or exit the vehicle upon which the lap bar assembly is mounted. Briefly, the lap bar assembly includes a locking mechanism or assembly that is adapted to prevent the lap bar from rotating in two different directions at different times or modes of operation of the lap bar assembly.

One exemplary design of the locking mechanism includes or utilizes a ratchet wheel and two pawls in conjunction with a trip cam and a cam follower.

Figure 1:
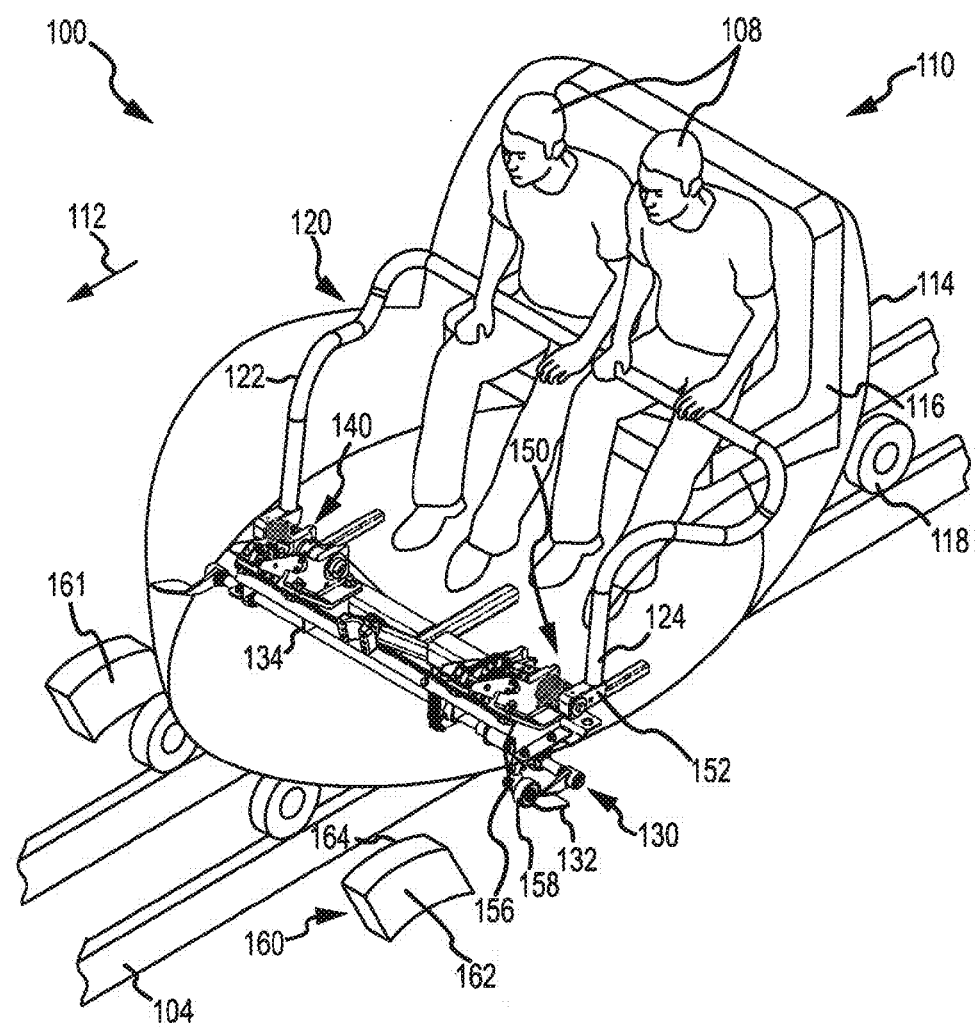
FIG. 1 shows perspective view of a portion of an amusement park ride including a vehicle with a lap bar assembly with a locking mechanism as described herein.

FIG. 1 illustrates a portion of an amusement park ride 100 that may utilize a dual function lap bar locking mechanism of an embodiment of the present invention. As shown, passengers 108 have been loaded and are riding in a ride vehicle 110 that has a frame or body 114 with a seat 116 for supporting the passengers 108. The vehicle 110 includes rollers/wheels 118 that ride on the track 104, which defines the path of the ride 100. This path includes a load/unload portion that includes a floor cam 160 with a body 162 that protrudes upward from a platform/frame that also supports the track 104, and the body 162 is adapted to position an arcuate profile contact surface 164 that contacts, during vehicle travel along the track as shown at 112, a cam follower of a locking mechanism to provide automated operation, e.g., locking and releasing, of a lap bar assembly 120 that is provided in the vehicle 110. Such automated operation is explained in detail below with reference to FIGS. 6A to 9B as may occur when the vehicle 110 moves into a load/unload portion of the amusement park ride 100 and a path defined by track 104.

As shown, the vehicle 110 includes a lap bar assembly 120. A mounting frame element 154 mounts or rigidly attaches the assembly 120 to the frame or body 114 of the vehicle 114, such as near the front of the passenger compartment containing the seat 116. The lap bar assembly 120 includes a lap bar 122 that extends upward from its mounting or connection ends 124 (e.g., vertical portions that extend upward parallel to each other on opposite sides of the lap bar 122), with the ends 124 attaching the lap bar 122 at one end to a lap bar damper mechanism 140 and at the other end to a lap bar locking mechanism 150. The lap bar damper mechanism 140 functions to control the rate at which the lap bar 122 is returned by the locking mechanism 150 to an uplock or release position, e.g., by action of a resilient member(s) such as a torsion spring(s) or the like. The damper mechanism 140 may be outfitted with a second cam follower to automatically lower the lab bar 122 via a secondary floor cam.

The lap bar assembly 120 also includes a lap bar release mechanism or assembly 130 that is interconnected with the locking mechanism/assembly 150 so as to release it from an uplock/released position in which it functions as support rail or grab bar to allow the passengers 108 to rotate/lower the lap bar 122 toward their laps or toward the seat 116. For example, and as explained below, a ride operator may use a foot pedal 132 attached to a lap bar release shaft or rod 134, which is connected to a cam follower to push one or more (typically a pair of redundant) pawls off of a contact/uplock surface of ratchet wheel. In this manner, the operator provides manual interaction to release the lap bar 122 from a grab bar function, but then can release the pedal 132 to allow the passenger 108 to adjust the position of the lap bar 122 relative to their lap to restrain them within the seat 116 and vehicle 110 (e.g., the operator does not have to retain contact with the pedal 132 and lap bar release mechanism to manually fit the lap bar to the passenger as was the case with many prior vehicle passenger restraint assemblies).

Figure 2:
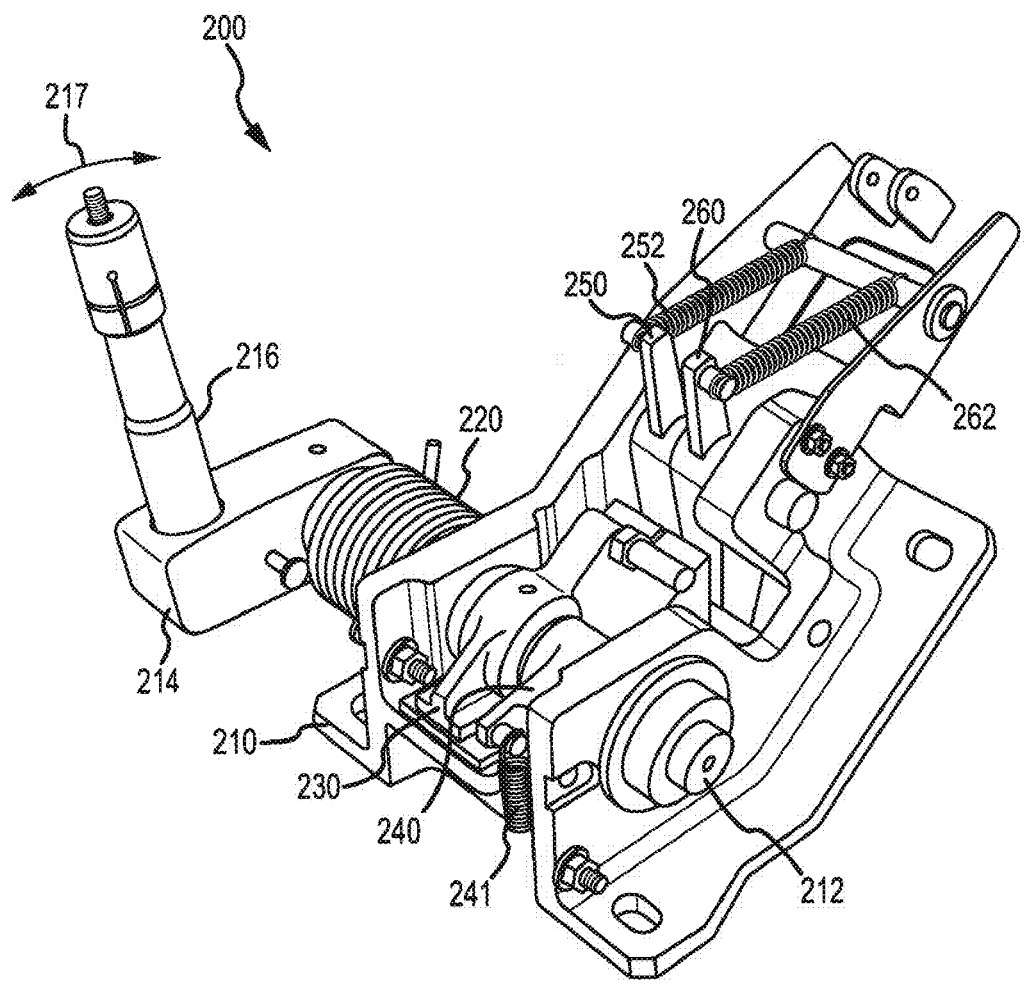
FIG. 2 shows a perspective view (right hand side view or view looking outward from inside a vehicle) of an exemplary locking mechanism or assembly that may be used in a ride vehicle to provide a lap bar providing a restraint or lap bar function and also a grab bar or support rail functionality as it locks in the down/restraint position and also in an up/released position.
Figure 3:
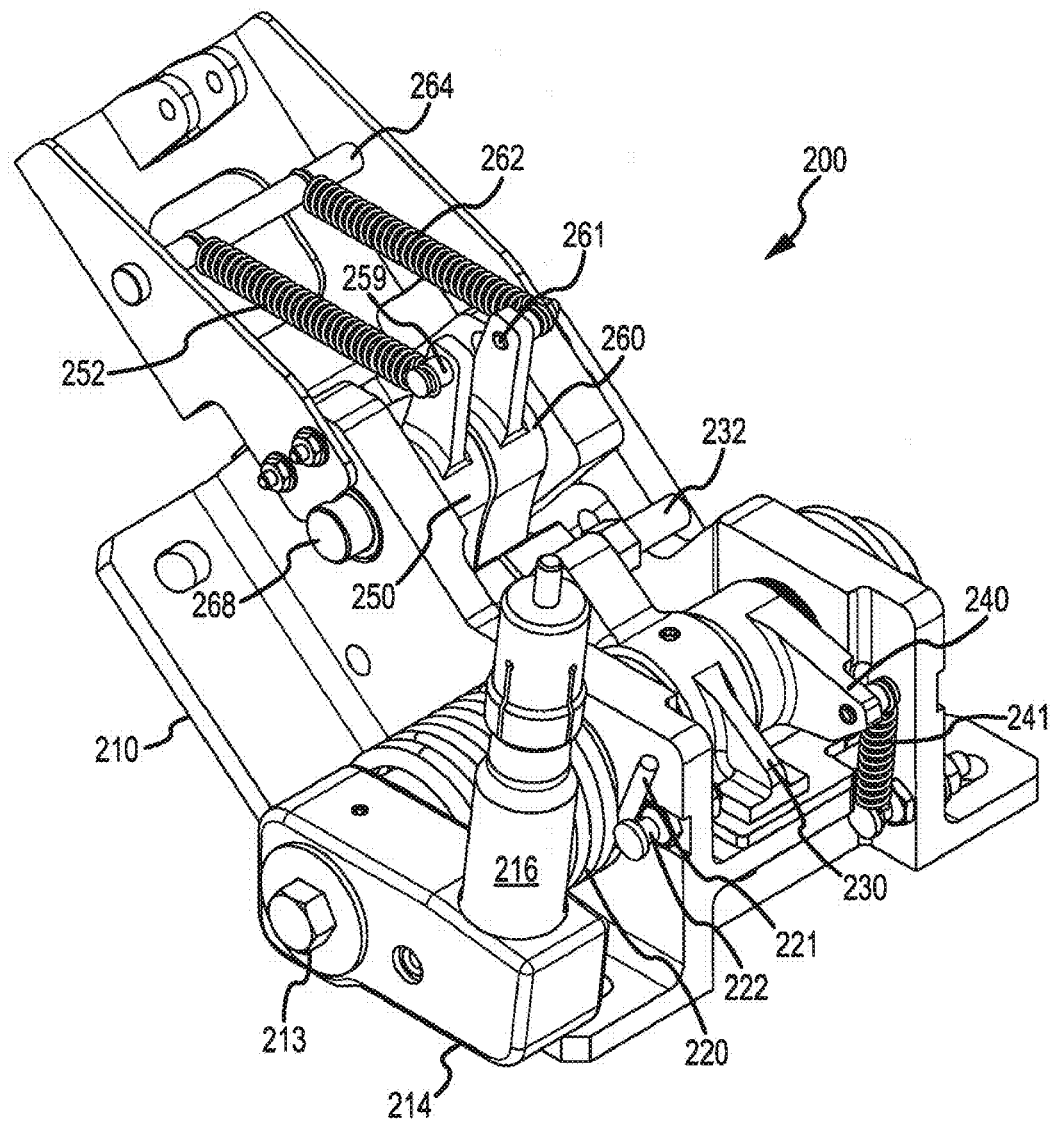
FIG. 3 shows another perspective view (e.g., a left hand side view or view looking inward toward a vehicle) of the locking mechanism or assembly of FIG. 2, as may be used in a vehicle such as shown in FIG. 1 to provide a dual function lap bar assembly.

Significantly, the lap bar assembly 120 includes a locking mechanism or assembly 150 that is attached to the frame via flange 210 which is attached (as shown in FIGS. 2 and 3) to the vehicle body 114. The locking mechanism 150 is attached to an end 124 of the lap bar 122 at lap bar connector or elbow 152, which is pivotally mounted to the locking mechanism 150. For example, a position-control shaft, axle, or rod may extend through the elbow 152 and other portions of the locking mechanism 150 so as to provide pivotal mounting of the lap bar 122 about a longitudinal axis of the position-control shaft (a similar or the same shaft may extend through the damper mechanism 140).

The operation of the locking mechanism 150 is explained in detail below but, for now, it is worth noting that the locking mechanism 150 includes a cam follower assembly pivotally supported within the locking mechanism 150 with an arm 156 extending downward or outside the vehicle body 114. A cam wheel 158 is provided at the end of the arm 156, and the cam wheel 158 contacts or abuts the contact edge/surface 164 of the floor/station cam 160 to cause the cam arm 156 to pivot about a mounting point of the cam follower. This movement causes interconnected or contacted portions of the locking mechanism to be selectively positioned to unlock or release the locking mechanism from a first locked position to release the lap bar 122 from a ride/down position, to place the lap bar 122 in a first unlocked position in which the lap bar 122 is free to return to an unlock or released position (such as via action of a spring or other resilient member), and then to allow a second locked position with the lap bar 122 in a grab bar/up position in which the passengers 108 may debark or load the vehicle 110. An additional floor/station cam 161 may be included for use in providing automatic lowering of the lap bar 122 toward the seat 116 and passengers 108.

FIGS. 2 and 3 provide perspective views (right hand/inside the vehicle and left hand/outside the vehicle views, respectively) of a locking mechanism or assembly 200 that may be mounted within a ride vehicle (such as part of a lap bar assembly in a vehicle as shown in FIG. 1 with lap bar assembly 120 in vehicle 110 of ride 100). It will be understood that a lap bar would be connected to lap bar spindle/connector 216 and would typically extend in a U-shape to provide a conventional lap bar that may be used to restrain one, two, three, or more guests or riders against a vehicle seat. In other cases, the connector spindle 216 may be connected to an over-the-shoulder type restraint as may be found in roller coaster or similar rides, as the locking mechanism 200 is not limited to use with lap bars but may be used with dual locking passenger restraints in general.

As shown in FIGS. 2 and 3, the locking mechanism 200 includes a mounting frame or flange 210 that may be used to rigidly affix the locking mechanism to a ride vehicle relative to a vehicle seat. Within the mounting frame or flange 210, a position-control shaft or axle 212 is positioned and supported such as with bearings for rotation about its center or longitudinal axis. At one end of the shaft 212, a lap bar connector element or elbow 214 is attached via fasteners 213 to rotate with the position-control shaft 212 during operation of the locking mechanism 200. A lap bar end or connector spindle 216 is rigidly attached to (or is a unitary piece of) the elbow 214, and a lap bar (not shown) would be attached to or otherwise extend from the spindle 216 so as to rotate and be positioned relative to a vehicle seat and any contained passengers when the shaft 212 and connected elbow 214 rotate in the locking mechanism 200.

In some embodiments, it is desirable for the locking mechanism 200 to function to return an attached lap bar from a down position (or first locked position) to a released/up position (or second locked position). To this end, a resilient member(s) may be provided to automatically move or rotate the shaft 212 to move the lap bar attached to elbow 214 and spindle 216 from the down to the up/released position (such as a rotation of the shaft through about 70 to 120 degrees or the like). As shown, a torsion spring 220 is provided as the automated return component, and the spring 220 may be positioned over a portion of the shaft 212 and connected at ends to the frame 210 and elbow 214. For example, FIG. 3 shows the end 221 of the spring 220 abutting a pin 222 extending out from the mounting frame/flange 210 such that the spring 220 applies a spring force against the mounting frame 210. A similar arrangement may be provided at the other end of the spring 220 to apply a force to the elbow 214.

The torsion spring 220 may be arranged on the shaft 212 such that it is compressed (or wound more tightly) when the lap bar is moved toward/into a first locked position with the lap bar in a ride or down position (with the shaft 212 being rotated clockwise in FIG. 3). This causes energy to be stored in the spring 220, and then when the shaft 212 is allowed to freely rotate in frame 210, e.g., when pawls are spaced apart from a ratchet wheel, the stored energy in the spring 220 is released as the spring 220 applies a spring force to the frame 210 at one end 221 at pin 222 and to the elbow 214 at another end. The applied spring force causes the shaft 212 to rotate, which, in turn, causes elbow 214, spindle 216, and an attached lap bar to rotate from the down/first locked position to an uplock/second locked position automatically or without ride operator or passenger assistance.

In many cases, it is desirable to allow passengers to set the position of the lap bar (e.g., to suit their size or girth) and to allow adjustments to be done in a stepwise manner. Also, it is desirable to securely lock the lap bar in the lowered or ride position set by the passenger. To this end, the locking mechanism 200 includes a ratchet wheel 230 that is coupled to the shaft or axle 212 so as to rotate with the shaft or axle 212. The ratchet wheel 230 includes a face or contact surface (or edge/side) that is not readily viewed in FIGS. 2 and 3. The contact face includes a plurality of teeth for engaging pawls 250 and 260, such that when a passenger rotates a lap bar it causes the shaft 212 via spindle 216 and elbow 214 to rotate (e.g., clockwise in FIG. 3). The ratchet wheel 230 further includes a striker or ratchet wheel pin 232 that is used, as explained with reference to FIGS. 6A to 9B to disengage or push a trip cam 240 off of the pawl 260 (e.g., to allow the ratchet wheel 230 to again engage the pawls 250, 260).

With the shaft 212, the ratchet wheel 230 rotates with the pawls 250, 260 engaging teeth for the ratchet wheel contact face to securely lock the lap bar in each position with an audible clicking noise indicating each stepwise locking. Pawl springs 252, 262 (or other resilient members) may be used to urge the pawls 250, 260 into contact with the ratchet wheel 230 as the springs 252, 262 apply a pulling or tensile force at one end of the pawls 250, 260 (an end opposite a ratchet contact lip or ridge on the pawls 250, 260). The pawls 250, 260 may be pivotally mounted via pawl shaft or pin 268 that extends through the mounting frame or flange 210. The pawls 250, 260 are both affixed to the shaft 268 such that they rotate together with the shaft 268. As shown in FIG. 3, the springs 252, 262 may be attached to the pawls 250, 260 at one end via a pin 251, 261 extending outward from the pawls 250, 260 and at an opposite end to the mounting frame/flange 210 via rod 264 or other attachment elements. The central or longitudinal axis of the pawl shaft 268 typically is parallel to the central axis of the position-control shaft 212 such that the pawls 250, 260 are spaced apart from the ratchet wheel 230 and other rotating components of the locking mechanism 200 but are also aligned for engaging the ratchet wheel teeth and applying a normal engagement force.

One pawl may be used in some embodiments, but the use of two pawls 250, 260 allows the pawls to be offset such as by half a pitch to double the number of adjustment positions (such as every 1 to 2 inches about a perimeter of an circular travel path of a lap bar or the like) and also to provide redundancy for safety (e.g., one pawl may fail and the other would engage to retain the locking mechanism in either the ride/down position or in the released/up position). The use of slightly offset pawls that rotate together about axis 268 is more clearly shown in later figures. Note, the mechanism is not limited to two pawls, with the use of more than two or multiple pawls being useful in some implementations to provide greater adjustment.

Figure 4:
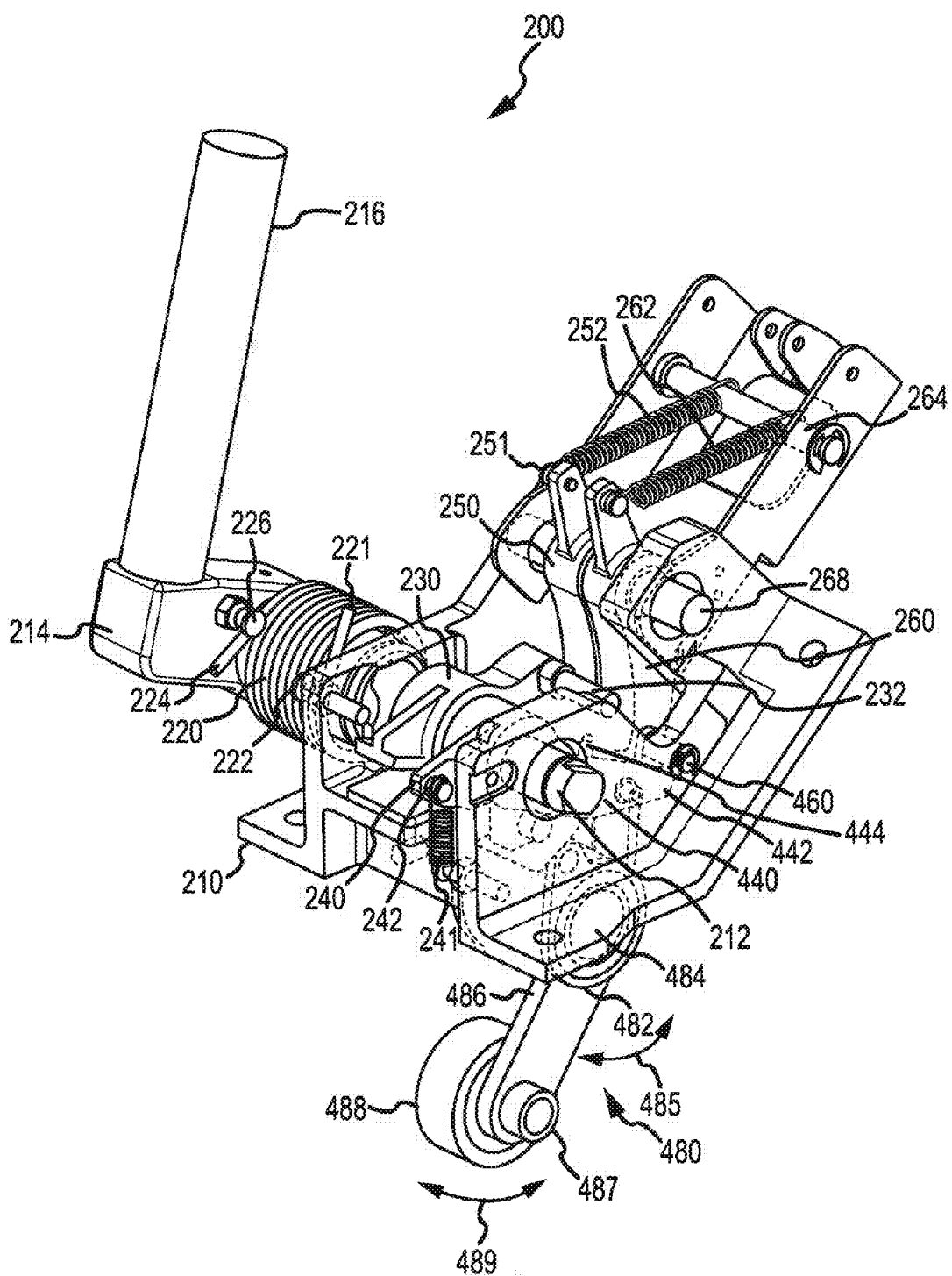
FIG. 4 shows a perspective view of the locking mechanism of FIGS. 2 and 3 from a right hand view point with a mounting bracket or support structure shown with ghosting to better allow viewing of components that provide automated locking in a ride/down position as well as in a released/up position.

With further reference to FIGS. 2-4, in addition to the two pawls 250, 260 and ratchet wheel 230, the locking mechanism 200 includes a trip cam 240. Briefly, the trip cam 240 is provided in mechanism 200 to selectively contact and position the pawl 260 so as to position the interconnected pawls 250, 260 at a distance (or spaced apart) from the contact surface of the ratchet wheel 230. This spacing allows the lap bar attached to the shaft 212 via elbow 214 and spindle 216 to travel or rotate from a lowered/ride position (e.g., first locked position) to a raised/released position (e.g., a second locked position) without interference between the pawls 250, 260 and the ratchet wheel 230. The return spring 220 applies a return force to the elbow 214 to cause this travel to occur by rotating shaft 212 in mounting frame 210. To provide these functionalities, the trip cam 240 is supported on the position-control shaft 212 such that it is free to rotate (i.e., not coupled tightly to the shaft 212 as is the case for the ratchet wheel 230). A resilient member such as a trip cam spring 241 is provided in locking mechanism 200 to urge the trip cam to rotate on the shaft 212 (e.g., counterclockwise in FIG. 2) to engage the pawl 260 to hold it apart from the ratchet wheel 230 (e.g., during the released or travel mode of operation of the locking mechanism 200). The trip cam spring 241 is attached at one end to the mounting flange 210 and at the other end to an end of the trip cam 240 so as to apply a tensile force to the trip cam 240 that causes it to want to rotate about the shaft 212.

FIG. 4 illustrates the locking mechanism or assembly 200 in more detail and showing details of some of the main components of the restraint lock or locking mechanism 200 that are hidden in FIGS. 2 and 3 that are used to provide locking in both the lowered and raised/released positions. These components are also showed in varying operating positions or modes in FIG. 5 (which provides a left hand (relative to a vehicle in which the assembly would be mounted) view of the restraint lock with a complete lap bar). Building on the understanding of locking mechanism 200 from FIGS. 2 and 3, FIG. 4 shows that the trip cam spring 241 is attached to an outboard end of the trip cam via a pin or protruding rod 242 and at an opposite end to the frame 210.

Figure 7A:
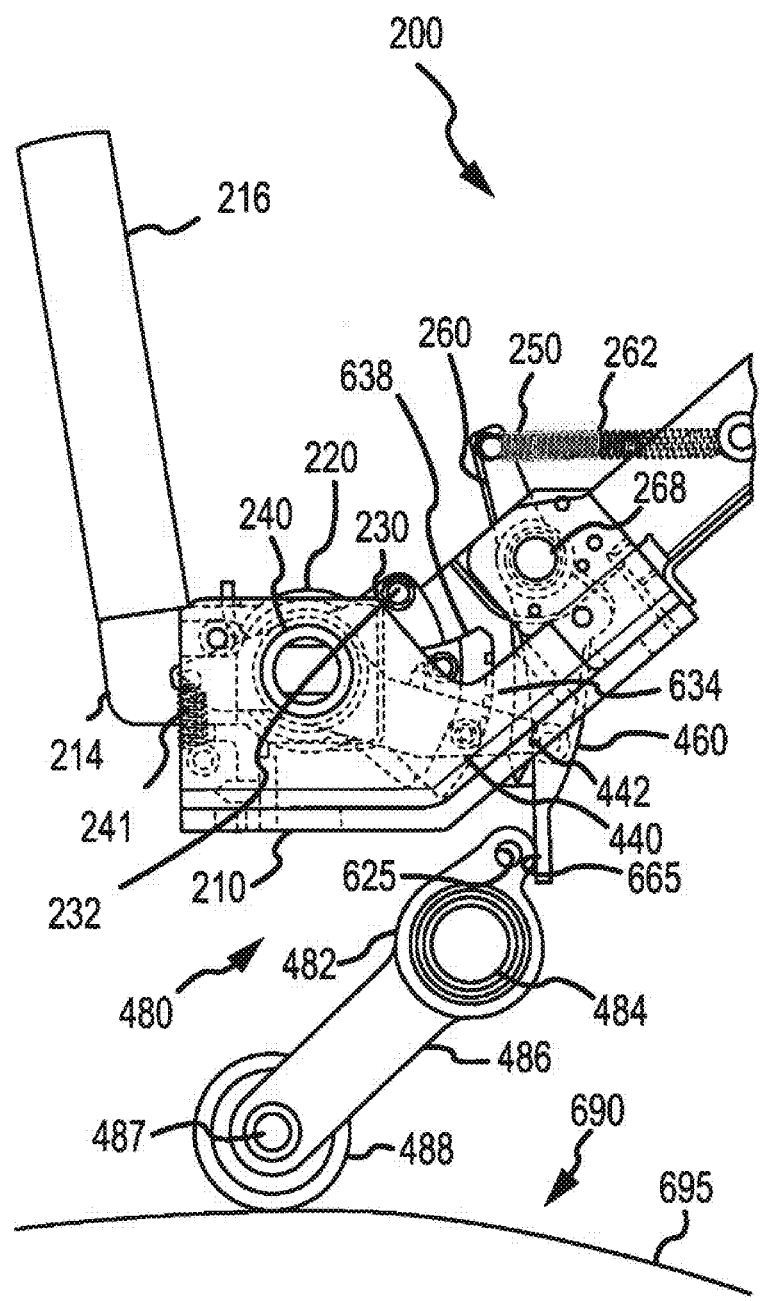
FIGS. 7A and 7B show right hand and left hand side views, respectively, of the locking mechanism of FIGS. 2-6B in a first unlocked position in which the two pawl's ratchet-engaging portion (e.g., a pawl lip, edge, ridge, tooth, or the like) has been disengaged from the ratchet teeth with a trip cam abutting a pin or arm extending out from the right hand pawl (e.g., the trip cam maintains a spacing or gap between the pawls and the ratchet wheel to allow the lap bar to rotate to a release or up position).
Figure 8A:
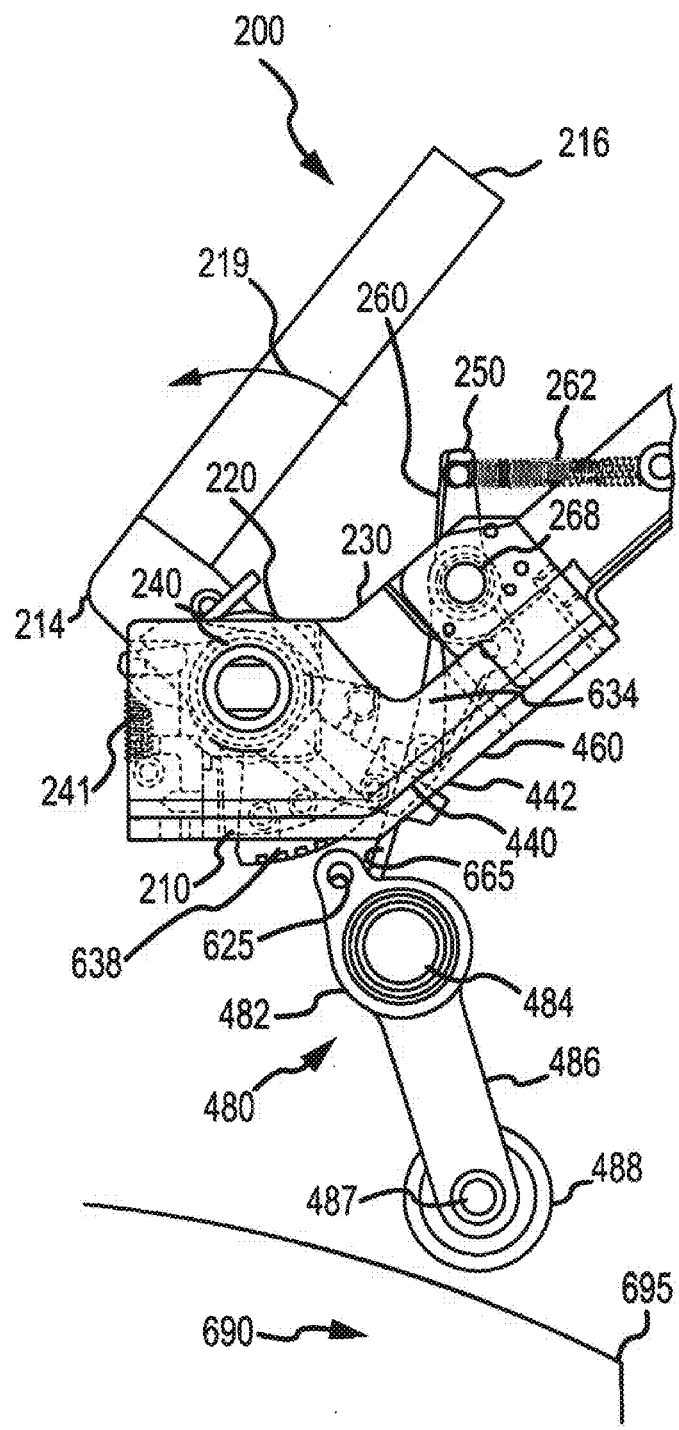
FIGS. 8A and 8B show right hand and left hand side views, respectively, of the locking mechanism of FIGS. 2-7B in a second locked orientation (i.e., in an up/uplock/released position) as may be the case when a vehicle has entered an unload/load portion of an amusement park ride with the lap bar locked via the locking mechanism such that the lap bar may be used as a physical support or grab bar during loading and unloading of the vehicle containing a lap bar assembly with the shown locking mechanism.

Note, the left and right pawls are typically linked via a pin(s), and this allows the trip cam to hold back the right pawl on the pawl roller while the left pawl is held back as well. The trip cam 240 has a body with an arm 440 that extends inboard or inward from the position-control shaft 212 toward the pawls 250, 260. In a first locked position shown in FIG. 4, the lap bar would be down or in a ride orientation relative to a vehicle. In this position of the shaft 212, the top surface of the arm 440 is urged by the trip cam spring 241 to abut a lower surface of a right hand pawl roller 460 that may be a cylindrical pin or arm extending outward from the right hand pawl 260 (such as in a perpendicular manner relative to a side of the body of the right hand pawl 260 parallel to the pawl support axle/shaft 268). In the illustrated position of FIG. 4, a tip or outer end 442 of the trip cam 240 is also below the pawl roller 460, but as shown in FIG. 7A, the tip 442 later contacts the side of the pawl roller 460 so as to maintain the pawls 250, 260 spaced apart from the ratchet wheel 230. The trip cam 240 is further shown to include an adjustable striker contact tip or ridge 444 that extends outward from an upper surface or edge of the arm 440. In the operational position shown in FIG. 4, the ridge 444 is spaced apart from ratchet wheel striker 232, but in a later operating stage as shown in FIG. 8A the striker 232 contacts the tip or ridge 444 forcing the trip cam tip 442 (and trip cam 240) to disengage from the right hand pawl 260 or off of the pawl roller 460 to allow the pawls 250, 260 to again rotate inward to engage the top surface of the ratchet wheel 230 for the secondary lock.

FIG. 4 also shows the cam follower 480 of the locking mechanism 200. As noted with reference to FIG. 1, the cam follower 480 is provided to interact with a station platform cam to rotate about a pivotal mounting in the housing or frame 210 to selectively contact the pawls 250, 260 to disengage them from the teeth of the ratchet wheel 230. To this end, the cam follower 480 includes a body 482 (e.g., a cylindrical tube or hollow shaft member) that is attached via pin or shaft 484 to allow the cam follower body 482 to rotate as shown at 485. Again, the central or longitudinal axis of shaft 484 may be spaced apart but parallel to the center axes of position-control shaft 212 such that the cam follower 480 is properly aligned within the locking mechanism 200 and to apply a releasing force normal to the pawls 250, 260 when activated by a station cam (not shown in FIGS. 4 and 5). The cam follower 480 also includes an arm 486 that extends out from the body 482 to provide a pivotal mount 487 (e.g., a pin or axle) for a wheel, roller, or cam wheel 488 that may rotate as shown at 489 when the cam wheel 488 contacts a contact surface of a station cam. During such a contact, a force is applied to the cam wheel 488 that is transferred via arm 486 to the body 482 to cause it to rotate as shown at 485 about mounting shaft 484.

FIG. 5 shows a left hand (or outboard) view of the locking mechanism 200 showing the mounting frame 210 attached to a vehicle frame 510. FIG. 5 also shows a full lap bar 216 that may be positioned in several positions with locking mechanism 200 including two locked positions (down/ride and up/released). In FIG. 5, the locking mechanism 200 is in a travel or first unlocked position with the ratchet wheel 230 spaced a distance apart from the pawls 250, 260 via travel cam 240. This positioning typically occurs when the cam wheel 488 rides on a contact surface of a station cam that causes the arm 486 to rotate 485 (e.g., counterclockwise in the view of FIG. 5) as the body 482 rotates about shaft 484, and such rotation of the cam follower 480 causes the follower 480 to push the pawls 250, 260 off of the ratchet wheel 230. This movement of the pawls 250, 260 allows the trip cam 240 to move into a travel position via trip cam spring 241 to have its tip 442 contact the pawl roller 460 on the right hand pawl 260, which holds the pawls apart from the ratchet wheel 230.

Figure 6A:
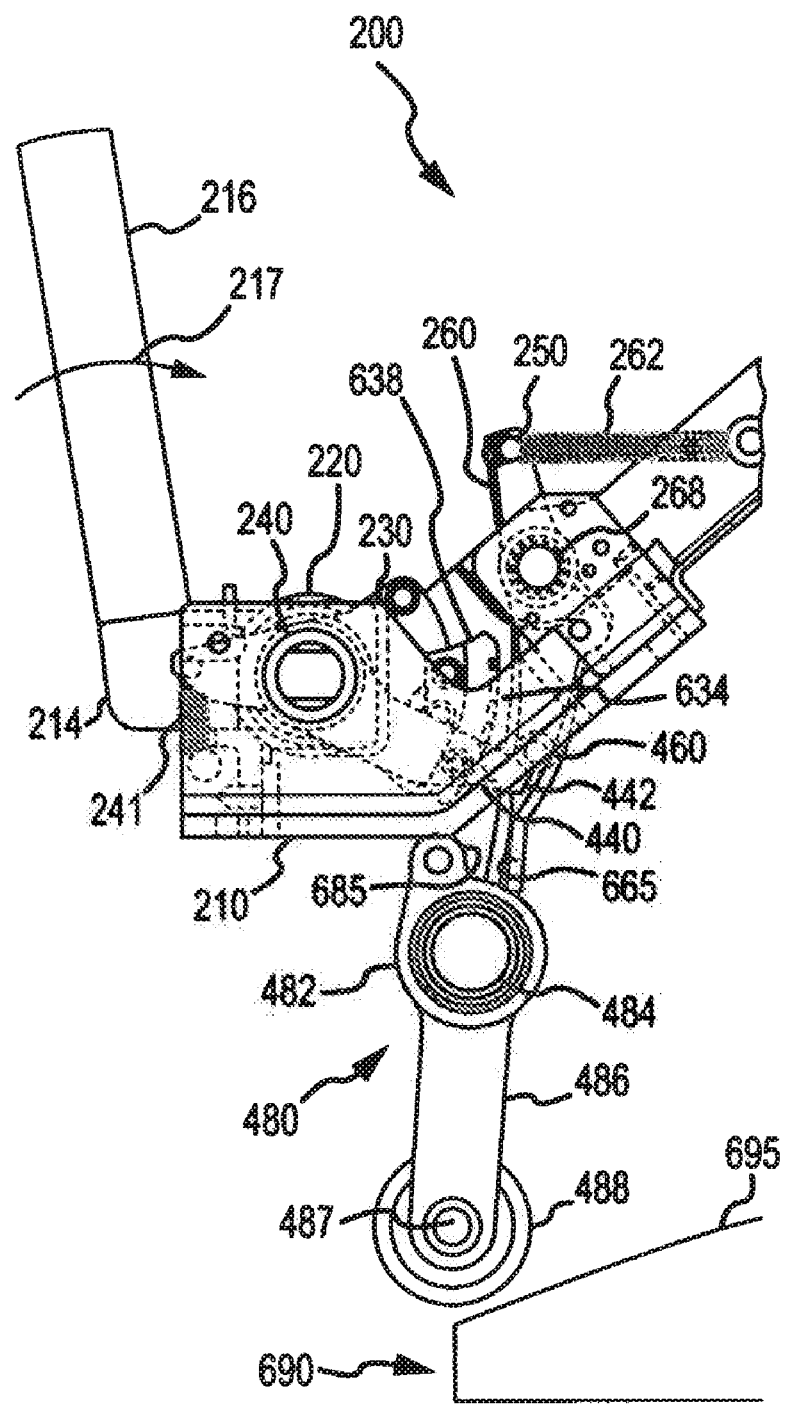
FIGS. 6A and 6B show right hand and left hand side views, respectively, of the locking mechanism of FIGS. 2-5 in a first locked orientation (i.e., in a down/ride position) as may be the case when a vehicle has been loaded with passengers and the passengers have positioned the lap bar against or near their lap in a stepwise or ratcheted motion.

FIGS. 4 and 5 show the restraint lock or locking assembly 200 from the left and right hand sides during its use and in varying operational positions to facilitate explanation of the arrangement of the components to provide automatic locking in the lowered and released positions of the lap bar. With reference to FIGS. 2-9A, it can be seen and understood that the locking mechanism 200 of lap bar assembly uses a ratchet wheel 230 and two pawls 250, 260 in conjunction with a trip cam 240 and cam follower 480 to prevent or block a lap bar that extends from spindle 216 from rotating in two different directions automatically during operation. Particularly, during the operation of a ride with a vehicle that includes a lap bar assembly with a locking mechanism 200 shown in the figures, the pawls 250, 260 are engaged with the ratchet teeth in wheel 240, and this engagement prevents the lap bar from rotating in the release direction (e.g., the riders/passengers of the vehicle cannot raise or lift the lap bar away from them or the vehicle seat). When the vehicle enters a ride station or load/unload portion of ride, the cam wheel 488 that is linked to the cam follower 480 contacts a lap bar release wheel or station cam and rides on a contact surface 695 of the station cam 690 as shown in FIGS. 6A and 9B. As a result, the cam follower 480 releases the pawls 250, 260 from the ratchet teeth 634 and engages the trip cam 240 with the pawl 260. The rotation of the cam follower may also be activated via automated cam allowing the vehicle to be stationary and the cam to move relative to the vehicle and retract.

Figure 7B:
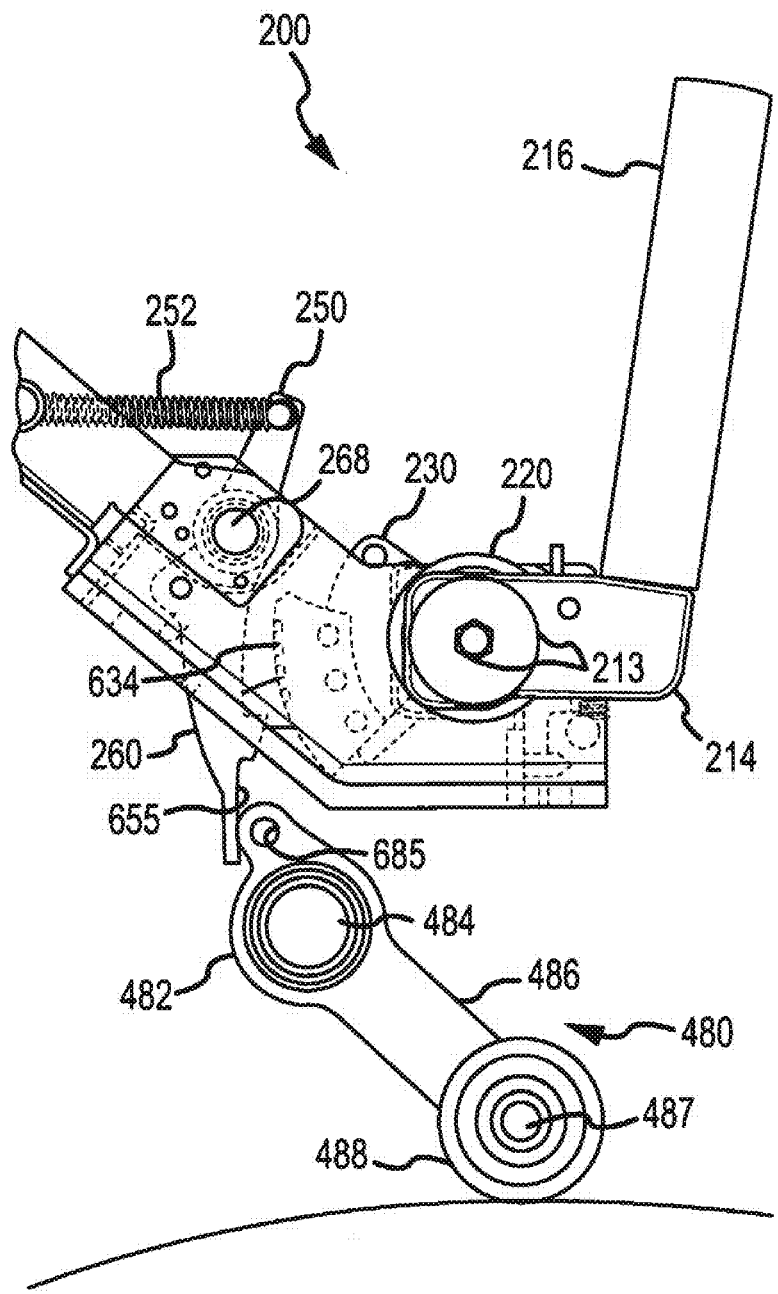
Figure 8B:
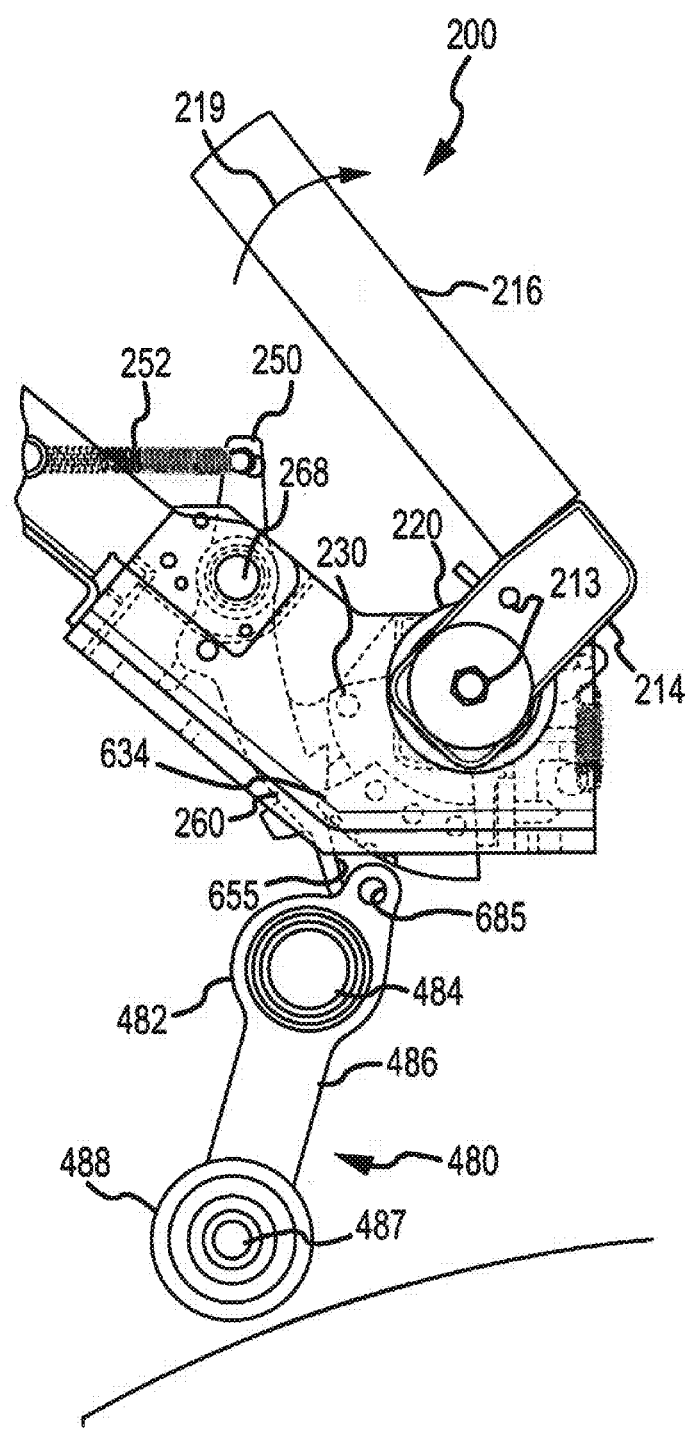

Significantly, this design that calls for or results in the trip cam 240 to engage the RH pawl roller 460 with tip 442 as shown in Position 2 (or a lap bar travel position) of FIGS. 7A and 7B causes the pawls 250, 260 to be held away or spaced apart from the ratchet teeth 634. This is useful as it allows the lap bar attached to spindle 216 to rise to a release position (such as by a release force provided by one or more lap bar return springs or other resilient members 220). The motion and timing of the releasing lap bar disengages the trip cam 240, which drops the spring-loaded pawls 250, 260 on top of the ratchet wheel 230 above the teeth 634 such as on an uplock contact surface or lip 638 (with surface(s) of pawls 250, 260, respectively). Once there or in this position, the pawls 250, 260 act to prevent the rotation of the lap bar in the lowering direction (e.g., the lap bar is locked in the released position so as to act as a grab or support bar for the vehicle passengers as shown in Position 3 of FIGS. 8A and 8B). After the passengers or guests leave and additional passengers enter the vehicle, a ride operator may manually press a foot pedal (as shown in FIG. 1) that releases the pawls 250, 260 off of the top surface 638 of the ratchet wheel 230 (but not too far as to engage the trip cam 240), thereby allowing the spring-activated pawls 250, 260 to re-engage the teeth 634 of wheel 230 with contact tips or teeth 857, 867 on the ratchet teeth 634 (with movement toward re-engagement shown in Position 4 of FIGS. 9A and 9B).

With reference to FIGS. 6A to 9B, operation of the lab bar/grab bar assembly may be explained more fully with a description of the four main operational positions in which the locking mechanism 200 and a lap bar attached to spindle 216 (as well as other components) are placed during use on a ride vehicle and its lap bar assembly. FIGS. 6A and 6B illustrate a first locked position ("Position 1"), which may be the lowered or the normal ride condition. In the first locked position, the assembly 200 may be used to restrain passengers in a vehicle or vehicle seat. The lap bar attached to spindle 216 is in the down and locked position as shown at 217 with a user/passenger able to move the lap bar to rotate via spindle 216 the shaft 212, which causes the ratchet wheel 230 to rotate, too, and pawls 250, 260 to engage the teeth 634 of ratchet wheel 230 with contact teeth or ridges. The pawls 250, 260, thus, are locked in the ratchet teeth 634 of wheel 230, which prevents the passenger(s) from rotating the lap bar (and shaft 212 and interconnected components wheel 230, elbow 214, and spindle 216) in a direction toward the release position shown in FIGS. 8A and 8B (e.g., to push the lap bar away from them or their laps).

Between Positions 1 and 2 (FIGS. 6A/6B and 7A/7B), the vehicle has traveled on a ride track/rail into a load/unload station, and the vehicle enters a station or load/unload portion of the ride in which the vehicle travels over a release wheel or station cam 690 (shown as a planar member with a curved or arced contact surface 695 positioned below the locking mechanism 200 (i.e., below the vehicle as it enters a station such as adjacent a track or groove guiding the ride vehicle)). The cam wheel 488 of the cam follower 480 rolls over the station cam 690, with the cam wheel 488 typically rotating about pin/shaft 487 as shown in FIGS. 7A and 7B. The cam follower arm 486 on which the cam wheel 488 is pivotally mounted is rotated causing the cam follower body 482 to rotate about shaft 484 such that cam follower striker or contact surface/member 685 contacts ends 655, 665 of cams 250, 260. This results in the cam follower 480 pushing the pawls 250, 260 off of or to disengage the ratchet teeth 634 of ratchet wheel 230.

Additionally (or later in the travel of cam wheel 488 on surface 695 of station cam 690), the cam follower 480 is rotated further to further rotate the pawls 250, 260. The trip cam 240 is lifted up by spring 241 when its arm 440 is free of its contact with pawl roller 460 such that the trip cam 240 has its engaging surface or tip 442 contacting or abutting against the right hand pawl roller 460. The trip cam 240, in this position, prevents both pawls 250, 260 from engaging the ratchet teeth 634 as the pawls 250, 260 are spaced apart some predefined distance or gap (such as at least 0.25 inches gap).

Position 2 shown in FIGS. 7A and 7B may be considered a first unlocked position or a travel position of the locking mechanism. Because with the pawls 250, 260 spaced apart from the ratchet wheel 230, the shaft 212 may be freely rotated such that the lap bar attached to spindle 216 via elbow 214 may also be rotated or moved from the lowered or first locked position toward a raised or released position as shown in FIGS. 8A and 8B. To this end, the lap bar return spring 220 acts to automatically raise the lap bar (move the bar away from the vehicle passengers) from the lowered/ride position to the raised/released position with one end 221 applying force against a pin 222 on frame 210 and a second end 224 applying a force against pin 226 on elbow 214. In some embodiments, the return member 220 is a torsion spring positioned over the shaft 212 while other arrangements for automatically rotating the shaft 212 from the lowered, first locked position to the raised, second locked position will be apparent to those skilled in the art and are considered part of this disclosure.

Specifically, between Positions 2 and 3 (a first unlocked or travel position shown in FIGS. 7A and 7B and a second locked or fully up position shown in FIGS. 8A and 8B), the vehicle has traveled further over the station cam surface 695 such that the station cam 690 and cam wheel 488 of the cam follower 480 are separated or spaced apart. In Position 3, when the lap bar raises 219 up to the fully raised or up position it rotates the shaft 212 and the ratchet wheel pin or striker 232 hits the trip cam 240 on its tip or ridge 444, which knocks the tip 442 of the trip cam 240 off of the right hand pawl roller 460 and the arm 440 of the trip cam 240 again contacts the lower surface of the pawl roller 460 on the right hand pawl 260. When the trip cam 240 is freed from the right hand pawl roller 460, both pawls 250, 260 are released and are rotated toward the ratchet wheel 230 by the spring force provided by pawl springs 252, 262. The uplock shelf or surfaces of the pawls 250, 260 contact the uplock or contact surface 638 of the ratchet wheel 230 adjacent the teeth 634, and the pawls 250, 260 become locked on top of the ratchet wheel 230 due to forces applied by the pawl springs 252, 262. The lap bar is now locked in the released position as shown in FIGS. 8A and 8B, making it available for use by the passengers as a steady grab rail during debarking and loading. At this time, passengers may enter the vehicle including the lap bar assembly (e.g., using the locked grab bar for support), and the passengers are seated. The shaft 212 cannot be rotated downward from this fully raised or released position.

Figure 6B:
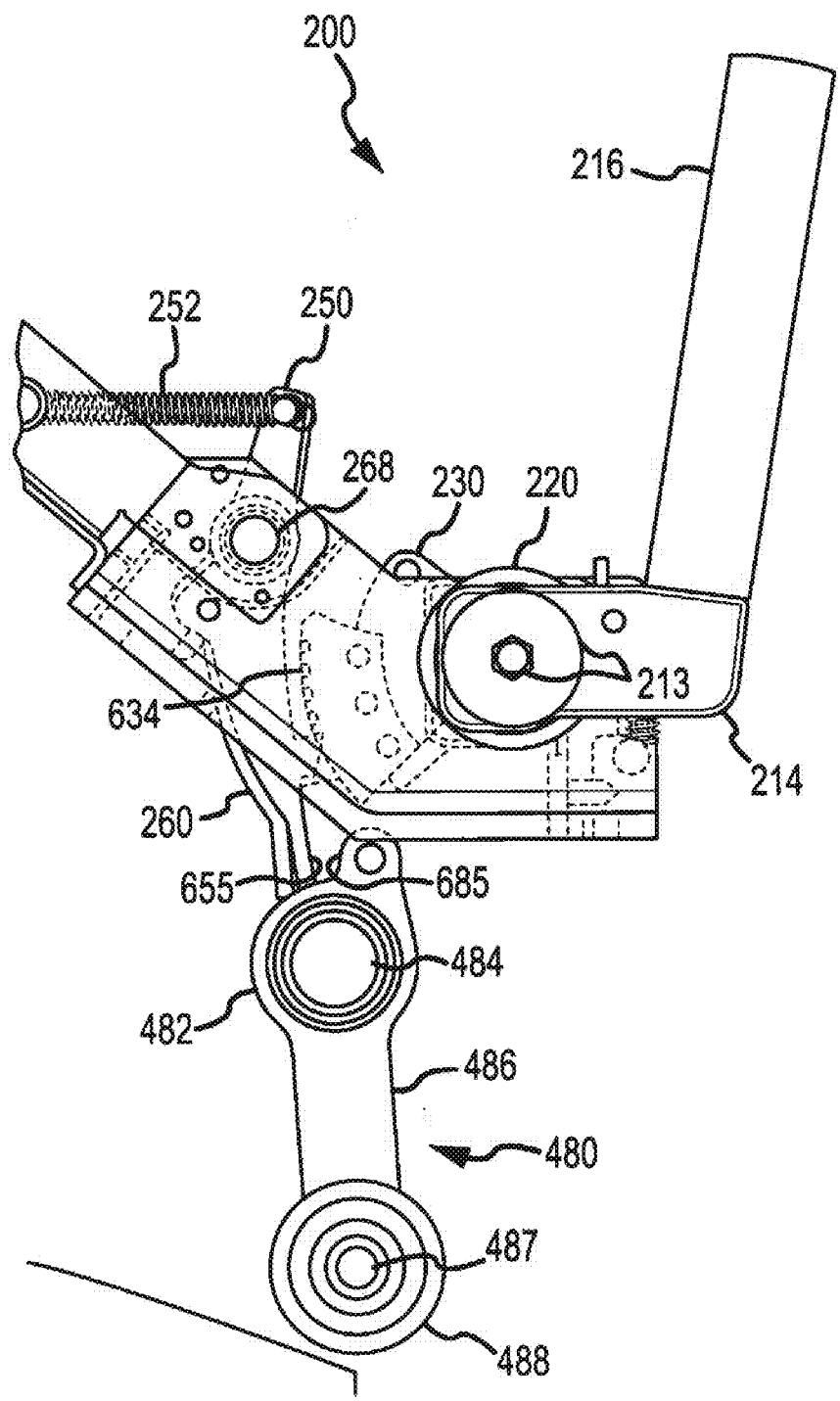
Figure 9A:
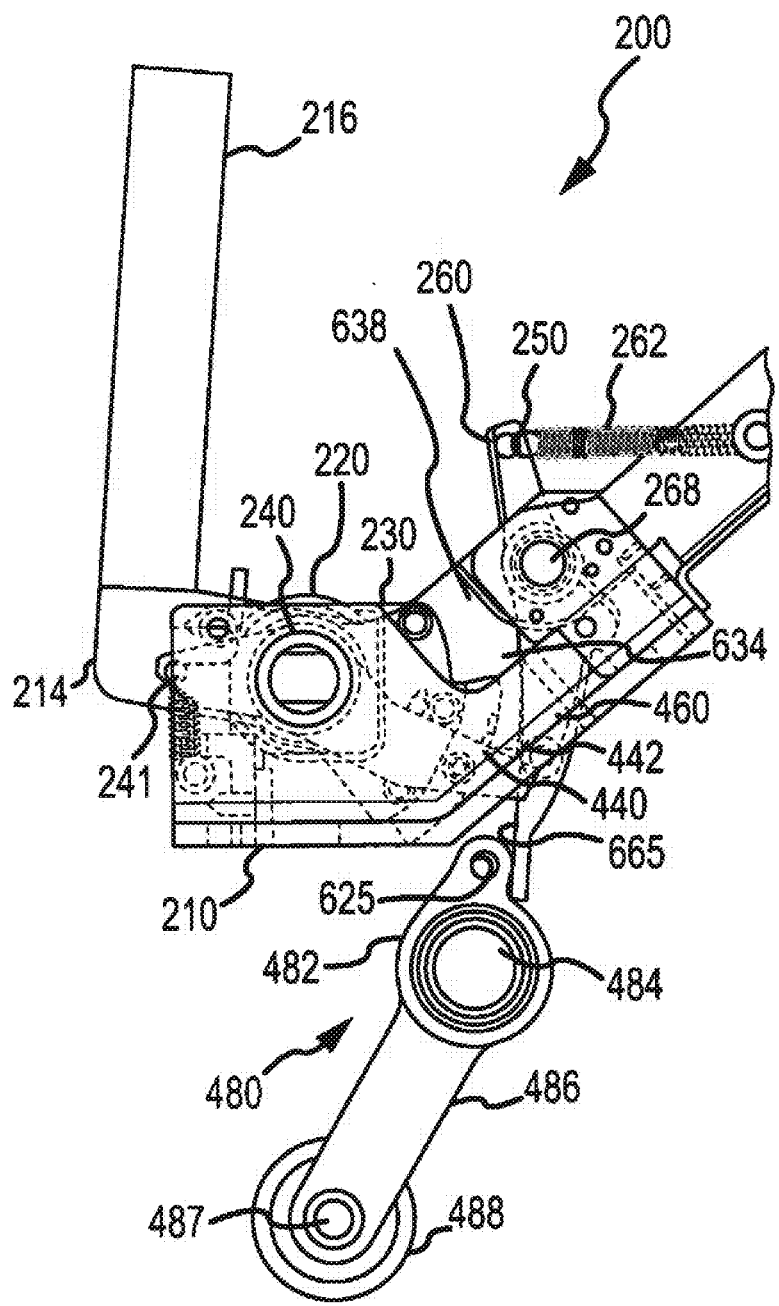
FIGS. 9A and 9B show right hand and left hand side views, respectively, of the locking mechanism of FIGS. 2-8B in a second unlocked position in which a ride operator uses a foot pedal attached, for example, to the cam follower to push both pawls off of the top of the ratchet wheel (and does not engage the trip cam) to allow the lap bar to be lowered by a passenger.
Figure 9B:
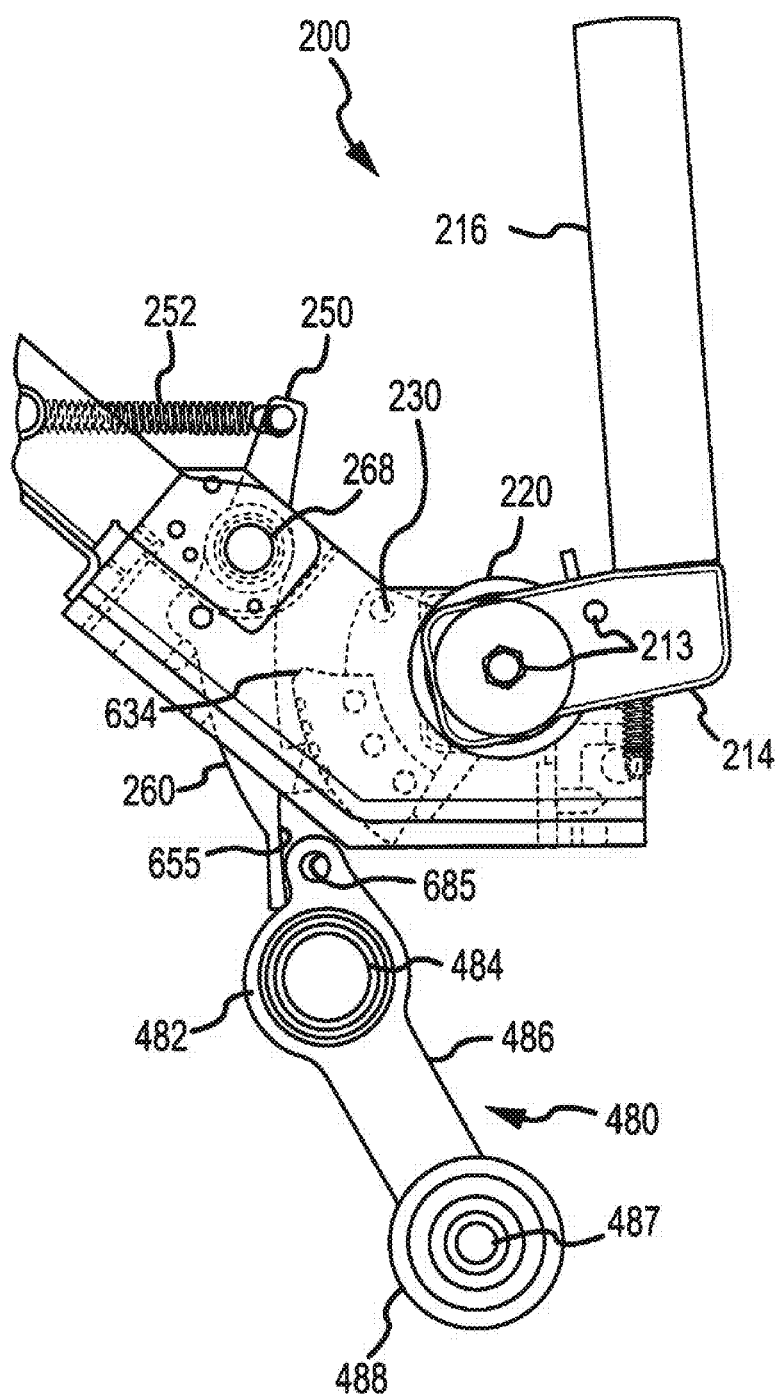

As shown in FIGS. 9A and 9B, a ride operator may now use a foot pedal or other release device attached to the cam follower 480 (for example, see release mechanism 130 shown in FIG. 1) to further rotate the cam follower 480 to push both pawls off of the top of the ratchet wheel but not so far as to set the trip cam. As a result, the lap bar may be lowered by a passenger, and the pawls 250, 260 re-engage the ratchet teeth 634 with pawl teeth/ridges. This locks the lap bar locking mechanism 200 in one of a plurality of the lowered positions (such as shown in FIGS. 6A and 6B) with the specific position being selectable by the passenger step-wise adjusting the position via ratchet wheel 230/pawls 250, 260 engagements (with an audible clicking sound to show each step (e.g., half pitch or the like step)), and the locking assembly 200 and lap bar attached to stub 216 are again in the ride condition/operating position.

The lap bar assemblies with locking mechanisms described herein and shown in the attached figures provide a number of advantages over prior designs for lap bars and passenger restraints. The new design is safer due to the provision of redundant locks in the locking mechanism and the increased number of locking positions (e.g., locked in two positions instead of just one (i.e., the lowered position)). The number of locking positions in the lowered or ride condition position is doubled accommodating a wider range of guest body types and additionally, containment is increased for different sized passengers (e.g., adults and children and the like) that may share a single group lap bar. The number of locking positions can be increased even further by additional pawl/ratchet sets (e.g., not, limited to just two). Passenger comfort is increased as they can choose (by pulling down on the lap bar to ratchet or stepwise move/adjust the bar) from a greater range/number of locking positions. Ride operators do not need to hold down a foot pedal while lowering the lap bar as was the case in prior designs (which also required accurate/precise positioning by the operator) as the passengers (or ride operators) may position the bar themselves with ratchets or ratcheted steps holding the lap bar in each of these "locked" lowered positioned (e.g., can continue to adjust in the lowering position(s) to suit their size or desired level of restraint). The designs of the lap bar assembly are modular and can be implemented in numerous vehicles with varying vehicle designs/configurations. The locking mechanism may be used with various lap bar/restraint shapes, e.g., T-bars, over-the-shoulder, and the like.

Some prior guest positioning/restraint systems utilized differing modes of locking the lap bar such as providing a friction lock device. In contrast, the described (and illustrated) locking mechanism uses redundant ratchets and pawls. Friction locks create a large amount of wear on the locking rod as they are actuated, and this wear requires constant adjustment to ensure the mechanism is still locking per the design intent. The lap bar assembly described herein does not require any ongoing adjustment to the locking mechanism.

Some existing friction lock designs require multiple linkages with complex parts and complexity. In contrast, the described lap bar assembly is a relatively simple, self-contained device that can be mounted to a vehicle via a four-bolt flange or other simple mounting arrangement. The attachment allows for easy removal and maintenance, e.g., the entire assembly may be removed and worked on separate from the vehicle.

Another disadvantage of some friction lock designs is that the lap bar can be forced open. The lap bar can be pushed with enough force such that the frictional force is overcome, which opens the lap bar. Grease, dirt, and/or lubricants on the locking rod can decrease the force required to open the lap bar or even disable the lock entirely. If multiple patrons are restrained under a single lap bar, the load per patron to overcome the frictional lock (and release the lap bar) decreases (e.g., if the force were 200 pounds, two passengers would have to apply 100 pounds each to release the lap bar). The lap bar assembly described herein, though, is designed to be used with lap bars that restrain multiple passengers within a vehicle but are tolerant of a dirty working environment as is common for amusement park rides and are nearly impossible to force open (e.g., would have to break ratchet teeth or the like).

Further, friction locks begin working as soon as the lap bar is lowered. This may be an undesirable effect if the operator wants to ensure the lap bar is locked at a certain distance or space relative to the passengers. A ratchet pawl system, in contrast, may be provided as shown in the attached figures that controls the locking positions to ensure the passengers are contained properly (not too much space between lap bar and passengers' laps). An audible clicking sound is another characteristic of the ratchet pawl locking mechanism of the lap bar assemblies, and such clicking is advantageous or desirable to the operator to ensure the lap bar is engaged and locked properly in a ride condition or position. Such clicking is not provided in a friction lock restraint. Further, a ratchet and pawl locking mechanism is typically a much more robust locking device than a friction lock.

Some ratchet-based restraint systems have been developed, but these fail to provide a number of the features or functions of the lap bar assembly described herein. For example, some ratchet-based restraint systems are not automated but instead may require a passenger sitting in a vehicle seat to manually pull and hold a lever out such that the pawls are backed off the ratchet wheel. Only in response to such passenger/operator manual positioning can the lap bar be released. However, due to the environmental conditions found in a theme or amusement park and their rides, it is preferred that the passengers sitting in the vehicle seat cannot manually or otherwise unlock the restraint device (e.g., cannot raise the lap bar during the ride or too early at the station). It is also advantageous in some cases that the unlocking of the restraint, release of the lap bar, and locking in an uplock or raised position all be automatic. Prior ratchet-based restraints have not met these preferred functions while the described lap bar assembly meets them all.

The lap bar assembly described herein unlocks the locking mechanism without human interaction. This is accomplished via the relative motion of the ride vehicle traveling over a fixed cam (station cam) on the floor of a station or load/unload portion of ride. A cam follower with a roller on the bottom of the lap bar assembly (and that typically extends outward from the vehicle bottom) contacts (with the roller) and travels over the floor cam. The geometry of the floor cam is adapted to cause the follower to rotate, which pushes the pawls off of the ratchet teeth. The pawls are pushed back and engage the trip cam, which keeps the pawls off of the ratchet teeth after the roller on the follower travels off the floor cam. The lap bar is then automatically raised without human assistance, such as via spring force provided by one or more lap bar return springs. The lap bar rotates to the top position and the ratchet wheel striker strikes and releases the trip cam allowing the pawls to rest on top of the ratchet. This engages the uplock.

The trip cam provides the automatic locking of the uplock (or locks the locking mechanism and interconnected lap bar in the released position). It was determined that whatever holds the pawls away from the ratchets should be removed only when the lap bar is at the up position. One could ask "why can't the floor or station cam geometry and cam follower be chosen to hold the pawls off the ratchets until the lap bar is in the up position?" A problem may arise when a passenger sitting in the vehicle seat holds the lap bar down (in the ride condition or position) as the vehicle travels over the station cam, which prevents the lap bar from rotating upward in response to the applied releasing (or spring) force. If the lap bar does not rotate, the pawl simply disengages off of the ratchets and then re-engages on the rackets relocking the lap bar (and restraining the passengers in the vehicle in the station). Instead, the trip cam in the described locking mechanisms is provided to always hold the pawls off of the ratchets and only disengage when the lap bar has traveled to an up or released position.

The proposed lap bar assembly allows for multiple passengers to be restrained by a single lap bar in a ride vehicle (but, of course, the mechanism described herein may also be used for single passengers with use of a T-bar, over-the-shoulder, or other restraint design). When in the up or released position, the multiple passengers may use the bar as a grab bar or support. The lap bar assembly may use a U-shaped lap bar (or other shape such as a T-bar or an over-the-shoulder restraint) that includes a portion or run that remains parallel to the shoulders of the seated and standing passengers and releases forward over the knees of the passengers and away from the passengers in the seat. This configuration helps reduce contact between the passengers and the lap bar when it automatically releases (e.g., less likely to strike the passenger in the arms or chin when it is automatically raised or released to the up position by a spring or other release force provided by the locking mechanism). The lap bar remains horizontal when in the restrained or ride position, which increases containment. Since the lap bar remains horizontal also in the uplock or raised/released position, it allows for multiple passengers along the width of the seat to use the lap bar as a grab bar or support (with the number of passengers only being limited by the width of the lap bar and the seat).

We claim:

1. A lap bar assembly for use in ride vehicles used in theme and amusement park rides, comprising:

a locking mechanism; and a lap bar pivotally mounted to the locking mechanism via a support axle, wherein the locking mechanism comprises a ratchet wheel affixed to the lap bar support axle, a pawl pivotally supported within the locking mechanism on a pawl support axle that is parallel and spaced apart from the lap bar support axle, a trip cam attached to the lap bar support axle, and a cam follower assembly that selectively engages the pawl, wherein the locking mechanism components are configured to automatically first lock in a ride position with the pawl engaging teeth of the ratchet wheel and second lock in a released position with the pawl engaging the ratchet wheel on a surface spaced apart from the teeth, wherein the cam follower assembly comprises a cam wheel rotatably supported upon a cam follower, and wherein the cam follower is pivotally supported within the locking mechanism, whereby the cam follower rotates about an axis when the cam wheel abuts a curved surface of a station cam to apply a releasing force on the pawl to disengage the first lock by spacing the pawl from the teeth of the ratchet wheel during the rotating about the axis as the cam wheel contacts the station cam.

2. The assembly of claim 1, further comprising a lap bar return spring linked to the lap bar support axle that applies a releasing spring force to move the lap bar from the ride position to the released position.

3. The assembly of claim 2, wherein the trip cam contacts and is supported by a pawl roller pin on the pawl to maintain the pawl spaced apart from the teeth of the ratchet wheel until the lap bar travels to the released position.

4. The assembly of claim 1, wherein the pawl comprises a left hand and a right hand pawl offset on the pawl support axle by at least about half a pitch to separately engage the teeth of the ratchet wheel.

5. The assembly of claim 4, the locking mechanism further comprising a pair of pawl springs applying spring forces to the left and right hand pawls, respectively, to urge the pawls to rotate on the pawl support axis, whereby ends of the pawls engage the ratchet wheel.

6. The assembly of claim 1, further comprising a lap bar release mechanism connected to the cam follower assembly operable to rotate the cam follower assembly to disengage the pawl from the ratchet wheel by pushing the pawl away from contact with the surface spaced apart from the teeth.

7. A dual function locking mechanism for passenger restraint devices, comprising:
  a mounting flange for attaching to a vehicle frame;
  a support shaft pivotally mounted to the mounting flange;
  a passenger restraint rigidly attached to the support shaft to pivot with the support shaft;
  a ratchet wheel with a plurality of teeth, wherein the ratchet wheel is coupled to the support shaft to rotate with the support shaft;
  a trip cam pivotally mounted to the support shaft with an arm extending outward from the support shaft;
  a pawl assembly pivotally supported in the locking mechanism and selectively engaging the teeth of the ratchet wheel to block rotation of the support shaft in a first direction while concurrently allowing rotation of the support shaft in a second direction opposite the first direction, wherein the trip cam is positionable to contact the pawl assembly with the trip cam arm to space the pawl assembly apart from the ratchet wheel and allow rotation of the support shaft in the second direction and travel of the passenger restraint to a raised position; and
  a resilient trip cam member attached to the trip cam at a point distal to the arm and applying a tensile force to cause the trip arm to rotate about the support shaft and contact the pawl assembly to space the pawl assembly apart from the ratchet wheel.

8. The mechanism of claim 7, further comprising a return spring applying a spring force to cause the support shaft to rotate in the second direction toward the raised position when the trip cam arm is contacting the pawl assembly to space the pawl assembly apart from the ratchet wheel.

9. The mechanism of claim 7, wherein the pawl assembly comprises a left hand pawl and a right hand pawl position side-by-side and attached to the mounting frame for concurrent pivoting about an axis parallel to the support shaft.

10. The mechanism of claim 9, wherein the right hand pawl includes a pawl roller extending outward and wherein the trip cam arm engages the pawl roller to maintain the pawls spaced apart from the ratchet wheel in a first unlocked position.

11. The mechanism of claim 10, wherein the pawl assembly further comprises a pawl pin interconnecting the right hand pawl and the left hand pawl.

12. The mechanism of claim 10, wherein the ratchet wheel comprises a striker extending outward a distance apart from the teeth and wherein the striker contacts the trip cam when the passenger restraint reaches the raised position to disengage the pawl roller and the trim cam arm.

13. The mechanism of claim 12, wherein after the trip cam is disengaged from the pawl roller, the pawls engage an uplock surface of the ratchet wheel blocking the support shaft from rotating in the first direction.

14. The mechanism of claim 7, further comprising a cam follower pivotally mounted to the mounting frame and rotating from a first position to a second position, during the rotating the cam follower contacts the pawl assembly to disengage the pawl assembly from the teeth of the ratchet wheel and to allow the trip cam arm to rotate about the support shaft to engage the pawl assembly and maintain the space.

15. An amusement park ride, comprising:
  a vehicle track including a station cam with an arcuate contact surface;
  a vehicle adapted for traveling on the vehicle track including over the station cam; and
  a lap bar assembly including a lap bar and a locking mechanism, where in the locking mechanism comprises a mounting frame attached to the vehicle, a support shaft pivotally mounted to the mounting frame with the lap bar coupled to the support shaft to rotate with the support shaft, a ratchet wheel affixed to the support shaft, a trip cam pivotally mounted to the support shaft, a pawl pivotally mounted to the mounting frame for selective engagement with the ratchet wheel including a first locked position comprising engagement with teeth on the ratchet wheel, and a cam follower pivotally mounted to the mounting frame,
  wherein the cam follower contacts the station cam and, in response, rotates to abut the pawl and disengage the pawl from the teeth of the ratchet wheel.

16. The ride of claim 15, wherein when the cam follower disengages the pawl from the teeth of the ratchet wheel the trip cam rotates about the support shaft via a spring force to engage the pawl and retain the pawl a distance from the ratchet wheel.

17. The ride of claim 16, further comprising a resilient return member for applying a spring force to rotate the support shaft and attached lap bar from to a second locked position while the pawl is retained the distance from the ratchet wheel by the trip cam.

18. The ride of claim 17, wherein the ratchet wheel comprises a striker extending outward laterally and wherein the ratchet wheel striker contacts the trip cam upon the support shaft rotating to the second locked position, whereby the trip cam is disengaged from the pawl and the pawl engages an uplock surface of the ratchet wheel at a location spaced apart from the teeth.

19. The ride of claim 18, wherein the support shaft is prevented from rotating in a first direction in the first locked position and from rotating a second direction opposite the first direction in the second locked position.

20. The ride of claim 17, wherein the lap bar assembly further comprises a damper assembly limiting a return velocity of the lap bar at least during travel away from the first locked position.

21. The ride of claim 15, wherein the lap bar assembly further comprises means for providing automatic lowering of the lap bar toward the first locked position.

22. A dual function locking mechanism for passenger restraint devices, comprising:
  a mounting flange for attaching to a vehicle frame;
  a support shaft pivotally mounted to the mounting flange;
  a passenger restraint rigidly attached to the support shaft to pivot with the support shaft;
  a ratchet wheel with a plurality of teeth, wherein the ratchet wheel is coupled to the support shaft to rotate with the support shaft;
  a trip cam pivotally mounted to the support shaft with an arm extending outward from the support shaft;
  a pawl assembly pivotally supported in the locking mechanism and selectively engaging the teeth of the ratchet wheel to block rotation of the support shaft in a first direction while concurrently allowing rotation of the support shaft in a second direction opposite the first direction, wherein the trip cam is positionable to contact the pawl assembly with the trip cam arm to space the pawl assembly apart from the ratchet wheel and allow rotation of the support shaft in the second direction and travel of the passenger restraint to a raised position; and a return spring applying a spring force to cause the support shaft to rotate in the second direction toward the raised position when the trip cam arm is contacting the pawl assembly to space the pawl assembly apart from the ratchet wheel.

23. The mechanism of claim 22, wherein the pawl assembly comprises a left hand pawl and a right hand pawl position side-by-side and attached to the mounting frame for concurrent pivoting about an axis parallel to the support shaft.

24. The mechanism of claim 23, wherein the right hand pawl includes a pawl roller extending outward and wherein the trip cam arm engages the pawl roller to maintain the pawls spaced apart from the ratchet wheel in a first unlocked position.

25. The mechanism of claim 24, wherein the pawl assembly further comprises a pawl pin interconnecting the right hand pawl and the left hand pawl.

26. The mechanism of claim 24, wherein the ratchet wheel comprises a striker extending outward a distance apart from the teeth and wherein the striker contacts the trip cam when the passenger restraint reaches the raised position to disengage the pawl roller and the trim cam arm.

27. The mechanism of claim 26, wherein after the trip cam is disengaged from the pawl roller, the pawls engage an uplock surface of the ratchet wheel blocking the support shaft from rotating in the first direction.

28. The mechanism of claim 22, further comprising a cam follower pivotally mounted to the mounting frame and rotating from a first position to a second position, during the rotating the cam follower contacts the pawl assembly to disengage the pawl assembly from the teeth of the ratchet wheel and to allow the trip cam arm to rotate about the support shaft to engage the pawl assembly and maintain the space.

29. A dual function locking mechanism for passenger restraint devices, comprising:
a mounting flange for attaching to a vehicle frame;
a support shaft pivotally mounted to the mounting flange;
a passenger restraint rigidly attached to the support shaft to pivot with the support shaft;
a ratchet wheel with a plurality of teeth, wherein the ratchet wheel is coupled to the support shaft to rotate with the support shaft;
a trip cam pivotally mounted to the support shaft with an arm extending outward from the support shaft; and
a pawl assembly pivotally supported in the locking mechanism and selectively engaging the teeth of the ratchet wheel to block rotation of the support shaft in a first direction while concurrently allowing rotation of the support shaft in a second direction opposite the first direction, wherein the trip cam is positionable to contact the pawl assembly with the trip cam arm to space the pawl assembly apart from the ratchet wheel and allow rotation of the support shaft in the second direction and travel of the passenger restraint to a raised position,
wherein the pawl assembly comprises a left hand pawl and a right hand pawl position side-by-side and attached to the mounting frame for concurrent pivoting about an axis parallel to the support shaft.

30. The mechanism of claim 29, wherein the right hand pawl includes a pawl roller extending outward and wherein the trip cam arm engages the pawl roller to maintain the pawls spaced apart from the ratchet wheel in a first unlocked position.

31. The mechanism of claim 30, wherein the pawl assembly further comprises a pawl pin interconnecting the right hand pawl and the left hand pawl.

32. The mechanism of claim 30, wherein the ratchet wheel comprises a striker extending outward a distance apart from the teeth and wherein the striker contacts the trip cam when the passenger restraint reaches the raised position to disengage the pawl roller and the trim cam arm.

33. The mechanism of claim 32, wherein after the trip cam is disengaged from the pawl roller, the pawls engage an uplock surface of the ratchet wheel blocking the support shaft from rotating in the first direction.

34. The mechanism of claim 29, further comprising a cam follower pivotally mounted to the mounting frame and rotating from a first position to a second position, during the rotating the cam follower contacts the pawl assembly to disengage the pawl assembly from the teeth of the ratchet wheel and to allow the trip cam arm to rotate about the support shaft to engage the pawl assembly and maintain the space.

* * * * *